United States Patent Office 3,320,652
Patented May 23, 1967

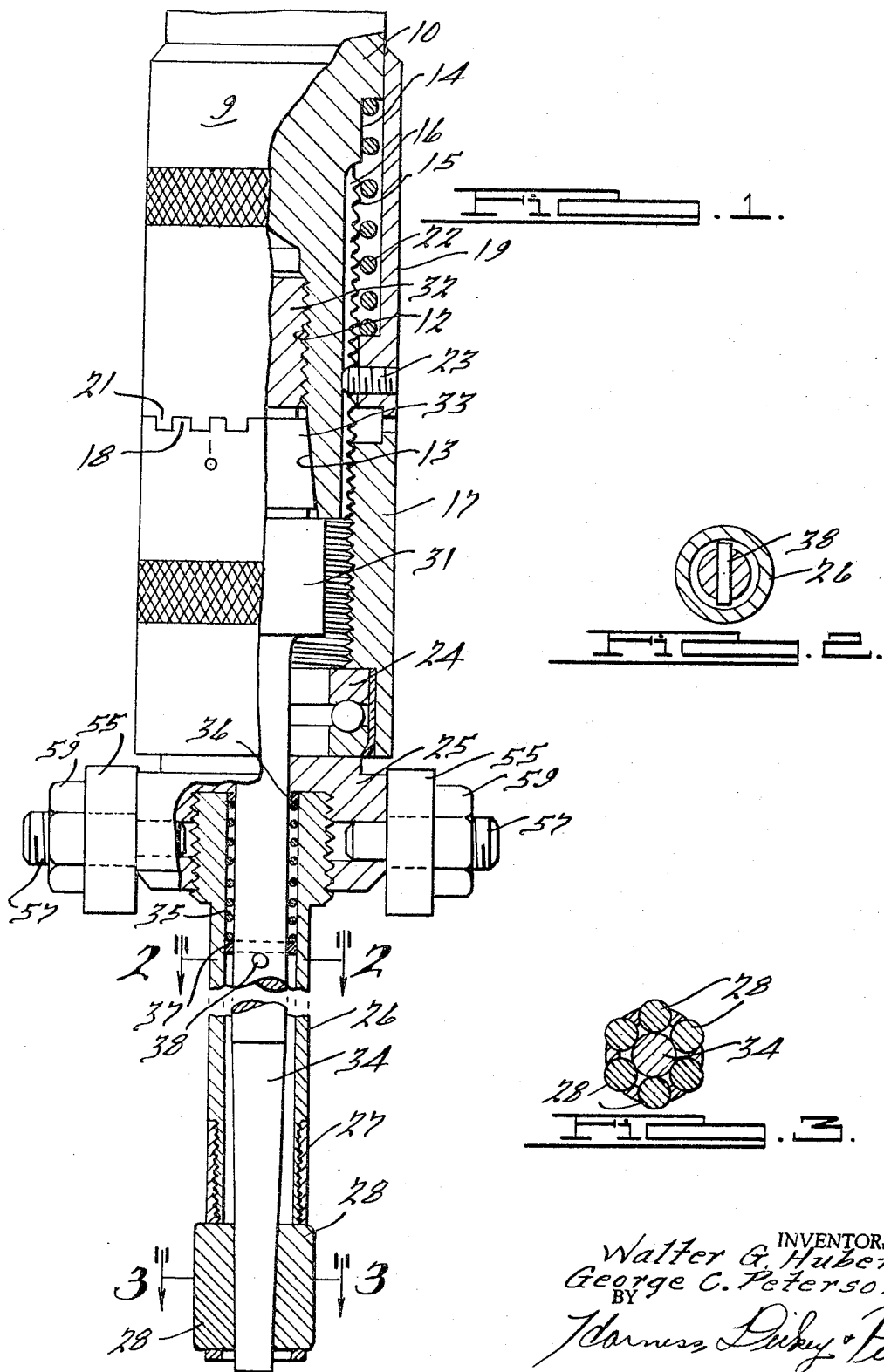

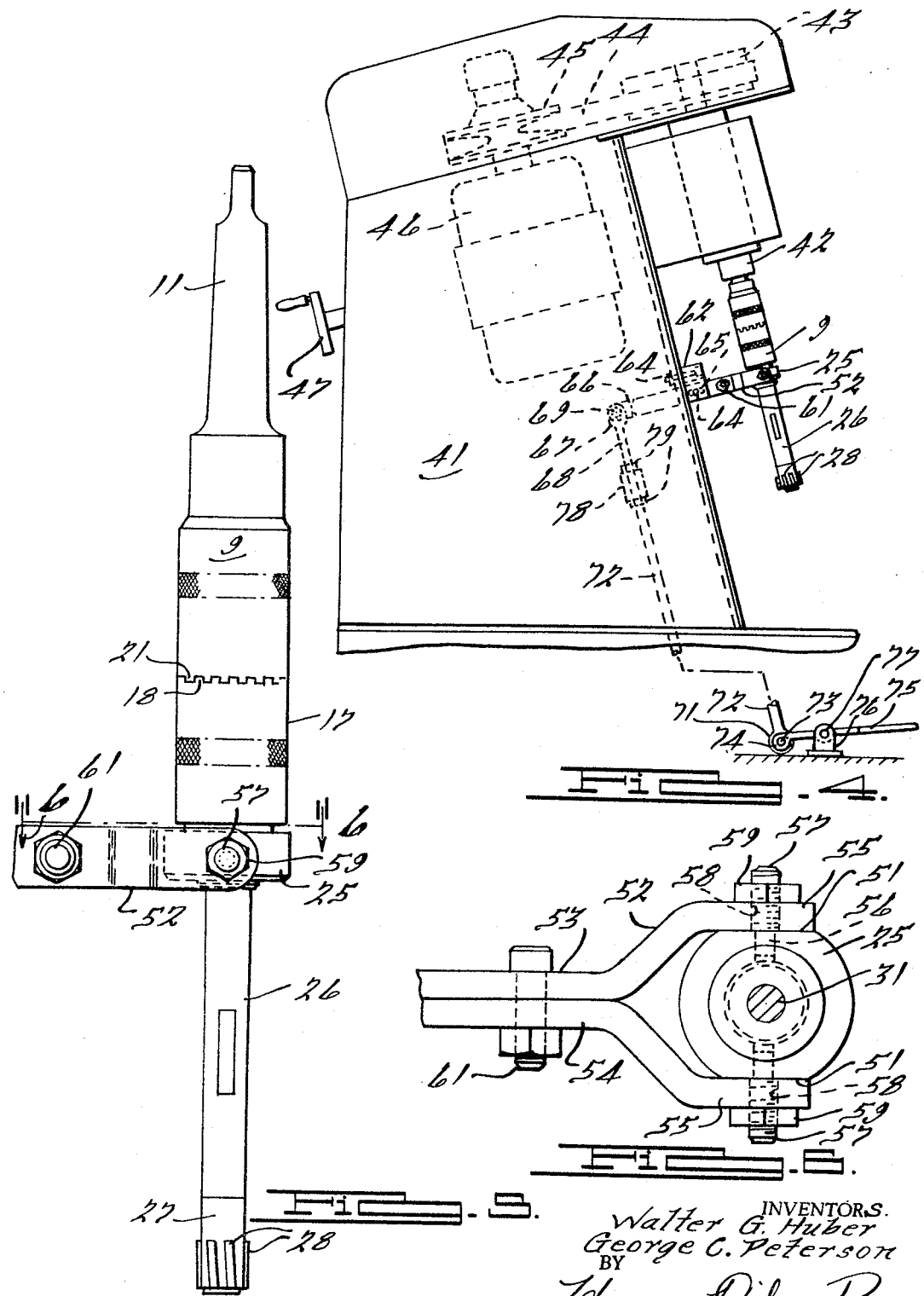

3,320,652
BURNISHING TOOL
Walter G. Huber and George C. Peterson, Grosse Pointe, Mich., assignors to Cogsdill Tool Products, Inc.
Filed Oct. 23, 1965, Ser. No. 503,619
6 Claims. (Cl. 29—90)

This invention relates to machine tools for burnishing workpieces and particularly to a machine tool for burnishing the inner surface of a hollow cylindrical article.

The machine tool of the present invention is employed for cold working the inner face of a hollow cylindrical article to smooth and harden the inner surface thereof. Since there are no projections on the outer peripherial surface of the article, the question of fixedly retaining and feeding the article over the working elements of the tool provided a problem solved by the machine tool of the present invention. The tool of the machine of the present invention has a head which is adjustable to position a spindle having a truncated conical end of small taper. The tapered end extends through a cage for supporting truncated conical rollers which are moved outwardly by the adjustment of the tapered end. To produce the feed of the workpiece over the driven tapered rollers, the rollers are tilted a small amount relative to the axis of the spindle. Such tilting may be in the order of a few degrees to produce the feeding of the elements over the rollers as they are diven so that the rollers can burnish the inner surface of the workpiece. The machine is so constructed as to support the tool and to drive it at a predetermined adjustable speed of rotation. After the workpiece passes upwardly over the tapered rollers, a lever system permits the operator to advance the cage to permit the rollers to move inwardly and the workpiece to drop therefrom. Fast and accurate operations are produced by the machine tool without the necessity of producing a fixture for supporting the workpiece and advancing it over the tool.

Accordingly, the main objects of the invention are: to provide a tool which burnishes the inner surface of a hollow cylindrical article and feeds the article without the necessity of clamping the article in fixed position; to provide tapered rollers on the end of a burnishing tool which are tilted to an angle sufficient to feed a hollow cylindrical workpiece driven over truncated conical rollers which perform a burnishing operation on the engaged surface; to provide a drive mechanism for rotating rollers of a burnishing tool which feeds a hollow cylindrical workpiece while burnishing the engaged surface; to provide a burnishing tool having driven rollers with a link system which moves the rollers toward the small end of tapered rollers which permits the rollers to retract and the workpiece to drop therefrom, and in general, to provide a machine tool for burnishing the inner surface of a hollow cylindrical workpiece which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken sectional view of a burnishing tool having features of the present invention;

FIG. 2 is a sectional view of the structure illustrated in FIG. 1, taken on the line 2—2 thereof;

FIG. 3 is a sectional view of the structure illustrated in FIG. 2, taken on the line 3—3 thereof;

FIG. 4 is a broken view in elevation of a machine for supporting the tool illustrated in FIG. 1;

FIG. 5 is a view in elevation of the tool illustrated in the machine of FIG. 4; and FIG. 6 is an enlarged sectional view of the structure illustrated in FIG. 5, taken on the line 6—6 thereof.

A tool 9 of the present invention, as illustrated in FIGS. 1 to 3, 5 and 6, embodies an arbor 10 having a chuck-engaging end 11, and a central threaded aperture 12 containing a conical extension 13. The spindle has a reduced body portion 14 which is threaded at 15 and which contains a longitudinal slot 16. A sleeve 17 is threaded on the lower end of the reduced body portion 14 having serrations 18 at the end. A sleeve 19 is disposed above the sleeve 17 having similar serrations 21 which interlock with the serrations 18, as clearly illustrated in FIG. 1. The sleeve 19 is urged downwardly by a spring 22 and a set screw 23 projecting in the slot 16 prevents the sleeve 19 from rotating on the spindle 10. By moving the sleeve 19 upwardly on the spindle 10, the sleeve 17 may be rotated on the threads to change its vertical position on the spindle 10. The adjustment is retained by the sleeve 19 upon its release by having its serrations 21 mate thereof with the serrations 18 on the sleeve 17.

The bottom of the sleeve 17 supports a bearing 24 against which a cage-supporting ring 25 abuts. A sleeve 26 is threaded within the ring 25 which has a threaded end on which a cage 27 is secured. The cage supports truncated conical rollers 28 which are tilted slightly relative to the axis of the tool to provide a feed to a workpiece when the rollers are driven in rotation. A spindle extension 31 has a threaded end 32 which is screwed into the threaded aperture 12 and a turncated conical portion 33 which mates with the conical surface 13. The lower end of spindle extension 31 has a tapered portion 34 on substantially the same taper as that of the tapered rollers 28 which positions the outer edges of the rollers substantially parallel to the tool axis. The outer diameter of the plurality of rollers 28 is controlled by the position of the tapered end 34 which may be adjusted to a desired position by the rotation of the sleeve 17 on the threads of the spindle 10, as pointed out thereinabove. A spring 35 is disposed within the sleeve 26 about the spindle extension 31 in abutting relation to a washer 36 in the ring 25, and a washer 37 resting on a pin 38 extending through the extension 31. This produces an upward bias to the collar 25 which is urged against the bearing 24.

The machine 41 illustrated in FIG. 4 supports one or a plurality of the tools 9 in one or a plurality of rotatable spindles 42 having a pulley 43 driven by a belt 44 by an expansible pulley 45 on the shaft of a motor 46. The motor is adjusted toward and away from the tool by a handle 47 to change the tension on the belt 44 and the diameter of the pulley 45 to thereby change the speed of rotation of the spindle 10 and the extension 31 carried thereby. A rocker bar 52 is made from two straps 53 and 54 having two spaced end sections 55, which, when secured together by a bolt 61, engage diametrically disposed flat faces 51 on the collar 25.

Studs 57 are secured in threaded apertures 58 in the sections 55 having fingers 56 projecting into apertures in the collar in pivoted relation thereto. A slotted block 62 is secured on the front face 63 of the machine by a pair of bolts 64. The rocker bar 52 extends within the slot and is pivotally secured therein on a pin 64 which extends through the block 62 and a slot 65 in the bar 52. The ends 66 of the bar 52 are also spaced apart to receive an eye 67 of a threaded stud 68 which is secured thereto by a pivot 69. An eye 71 on a threaded stud 72 is secured by a pivot 73 to a bifurcated end 74 of a foot pedal 75 which is secured on a bracket 76 by a pivot 77. The adjacent ends of the threaded studs 68 and 72 are secured together by a turnbuckle 79 which adjusts the lengths of the studs and is retained in secured position by nuts 79.

When the foot pedal 75 is moved downwardly, the bar 52 is rocked clockwise, moving the collar 25 and the cage 27 downwardly, thereby moving the truncated rollers 28 downwardly on the tapered end 35 of the extension 31. This permits the rollers to move inwardly and release the workpiece advanced upwardly on the roller and permits it to drop therefrom. Another workpiece may then be slipped onto the rollers and the foot pedal released so that the rollers will again be expanded and be driven by the tapered end 34 to advance the workpiece and the workpiece to move the cold worked inner surface thereof. Before the workpiece advances beyond the rollers, the foot pedal 75 is again moved downwardly permitting the rollers 28 to move inwardly away from the workpiece so that it will drop therefrom.

What is claimed is:

1. In a tool for burnishing the inner surface of a hollow cylindrical workpiece, a spindle having a tapered end, an adjustable sleeve on said spindle, a bearing on the end of said sleeve, a collar engaging said bearing, a cage supported by the collar having recesses therein, means for retaining said cage from rotating, truncated conical rollers in said recesses which are radially adjustable by the tapered end of the spindle in engagement therewith, and means for rotating said spindle for driving said rollers by said tapered end.

2. In a tool for burnishing the inner surface of a hollow cylindrical workpiece, a spindle having a tapered end, an adjustable sleeve on said spindle, a bearing on the end of said sleeve, a collar engaging said bearing, a cage supported by the collar having recesses therein, means for retaining said cage from rotating, truncated conical rollers in said recess which are radially adjustable by the tapered end of the spindle in engagement therewith, and means for rotating said spindle for driving said rollers by said tapered end, said rollers being tilted at a slight angle to the axis of the spindle for producing a feed movement for advancing the workpiece upwardly on the rollers during the rotation thereof.

3. In a tool for burnishing the inner surface of a hollow cylindrical workpiece, a spindle having a tapered end, an adjustable sleeve on said spindle, a bearing on the end of said sleeve, a collar engaging said bearing, a cage supported by the collar having recesses therein, means for retaining said cage from rotating, truncated conical rollers in said recesses which are radially adjustable by the tapered end of the spindle in engagement therewith, means for rotating said spindle for driving said rollers by said tapered end, and means for moving said collar away from said bearing to move the cage and rollers toward the smaller end of said tapered portion of the spindle to permit the rollers to retract and the workpiece to drop therefrom.

4. In a tool for burnishing the inner surface of a hollow cylindrical workpiece, a spindle having a tapered end, an adjustable sleeve on said spindle, a bearing on the end of said sleeve, a collar engaging said bearing, a cage supported by the collar having recesses therein, means for retaining said cage from rotating, truncated conical rollers in said recesses which are radially adjustable by the tapered end of the spindle in engagement therewith, means for rotating said spindle for driving said rollers by said tapered end, means for moving said collar away from said bearing to move the cage and rollers toward the smaller end of said tapered portion of the spindle to permit the rollers to retract and the workpiece to drop therefrom, and a spring on said spindle for moving said collar upwardly against said bearing.

5. In a machine having a driven element for receiving the end of a spindle of a tool, a reciprocal collar on said tool, work performing means on said tool, and a link system pivoted on said machine and to said collar for moving it downwardly on said spindle to adjust said means relative to said spindle.

6. In a machine having a driven element for receiving the end of a spindle of a tool, a reciprocal collar on said tool, work performing means on said tool, a link system pivoted on said machine and to said collar for moving it downwardly on said spindle to adjust said means relative to said spindle, drive means for said tool, a motor for driving said drive means, and means for adjusting said motor for changing the drive means and the speed at which the collet is driven.

No references cited.

RICHARD H. EANES, JR., *Primary Examiner.*